United States Patent [19]

Killat et al.

[11] Patent Number: 4,592,049
[45] Date of Patent: May 27, 1986

[54] METHOD OF AND ARRANGEMENT FOR CONTROLLING ACCESS TO A TIME-DIVISION MULTIPLEX MESSAGE TRANSMISSION PATH

[75] Inventors: Ulrich Killat, Hamburg; Dieter Riekmann, Pinneberg; Rolf Stecher, Hamburg, all of Fed. Rep. of Germany

[73] Assignee: U.S. Philips Corporation, New York, N.Y.

[21] Appl. No.: 569,650

[22] Filed: Jan. 10, 1984

[30] Foreign Application Priority Data

Jan. 10, 1983 [DE] Fed. Rep. of Germany ....... 3300531
Oct. 13, 1983 [DE] Fed. Rep. of Germany ....... 3337289

[51] Int. Cl.⁴ .............................. H04J 3/00; H04J 3/16
[52] U.S. Cl. ......................................... 370/87; 370/89; 370/94
[58] Field of Search ...................... 370/94, 60, 87, 84, 370/79, 86, 89; 340/825.5

[56] References Cited

U.S. PATENT DOCUMENTS

| | | | |
|---|---|---|---|
| 3,863,220 | 1/1975 | Osawa et al. | 370/89 |
| 4,154,983 | 4/1979 | Pederson | 370/94 |
| 4,225,753 | 9/1980 | Chown et al. | 370/86 |
| 4,320,467 | 3/1982 | Glass | 340/825.5 |
| 4,357,700 | 11/1982 | Alvarez, III et al. | 370/84 |
| 4,432,054 | 2/1984 | Okada et al. | 340/825.5 |
| 4,488,218 | 12/1984 | Grimes | 340/825.5 |

*Primary Examiner*—Douglas W. Olms
*Assistant Examiner*—Curtis Kuntz
*Attorney, Agent, or Firm*—Thomas A. Briody; William J. Streeter; Leroy Eason

[57] ABSTRACT

Method the transmission of data packets in a TDM transmission loop wherein the frame is subdivided into several groups each having the same number of words, and each group comprises either exclusively narrow-band channels for the transmission of speech data or is associated with the high-rate channel for groups comprising narrow-band channels always comprises an unambiguous bit sample of, for example, the highest priority is assigned to each group. When a subscriber station wants access to a word group in the high-rate channel it transmits its own identifying bit sample and possibly priority data in a signaling word. When this bit sample is returned through the loop undisturbed the subscriber station immediately accesses the assigned group of words in the high-rate channel for the transmission of a data packet. Allocation of channel access among individual subscriber stations is prioritized. The bit samples identifying groups comprising narrow-band channels receive the highest priority, so that these channels are automatically protected from access as a high-rate channel. A central control unit can increase the number of narrow-band channels by transmitting a further group of identifying bit samples in the signaling word.

18 Claims, 9 Drawing Figures

METHOD OF AND ARRANGEMENT FOR CONTROLLING ACCESS TO A TIME-DIVISION MULTIPLEX MESSAGE TRANSMISSION PATH

BACKGROUND OF THE INVENTION

1. Field of the Invention

The invention relates to a method of controlling access to a time-division multiplex message transmission path to which a central unit and a plurality of subscribers are connected and on which the central unit produces cyclically recurring frames of a predetermined number of words each having a predetermined number of bits, at least one signaling word being assigned to each frame. A variable, contiguous portion of the said number of words is allocated to narrow-band channels through each of which a word is transmitted in each frame, and a further variable, contiguous portion of the said number of words is reserved for the forming of a high-rate channel through which data packets are transmitted during each sequence of consecutive words.

2. Description of the Prior Art

Such a method is disclosed in U.S. Pat. No. 4,154,983, in which a ring transmission path is used, the selection of the subscribers to be interconnected in the narrow-band channels being effected by signalling information in the signal words of successive frames. The partition between the narrow-band channels and the high-rate channel is formed by a predetermined marker bit assigned to each data word, which bit gets a different value at the end of the narrow-band channels. Controlling the access to the high-rate channel by a subscriber is in essence effected by the central unit. Consequently the central control unit must perform a plurality of control functions so that the control unit is complicated and bulky.

It is an object of the invention to provide a method of the type described in the opening paragraph, which has a variable partition between the narrow-band channels and the high-rate channel, access to the high-rate channel entirely being controlled by the subscribers without assistance from the central unit.

SUMMARY OF THE INVENTION

According to the invention, this object is accomplished in that the frame is divided into several groups of words, a signalling word being assigned to each group, the central control unit continuously transmits a predetermined first bit sample in the signalling words of the groups to which narrow-band channels are assigned and that prior to transmission of a data packet in the high-rate channel a subscriber transmits, in a signalling word, which does not contain the first bit sample, a bit sample which is individually assigned to him. At a subsequent reception of that undisturbed bit sample in the group to which that signalling word is assigned, the subscriber transmits his data packet. Thus a subscriber which receives his individually assigned bit sample without any disturbance automatically is given access to the groups of words assigned to the high-rate channel without cooperation of the central unit being required. On the other hand, the narrow-band channels are unambiguously identified and access to it by a subscriber wanting to use it as a high rate channel is automatically inhibited.

It is particularly advantageous when all groups contain the same number of words, as this enables a particularly simple and convenient control.

GENERAL INFORMATION

The transmission of signalling words can be effected in several ways; for example, in further channels outside the message channels. A particularly simple structure is obtained when each word group contains the signalling word which is assigned to the subsequent word group. The spacing between the group in which the signalling word is provided and the group to which the signalling word is assigned is the same for all groups and is determined by the overall time delay of the signals on the physical message transmission path.

When several subscribers simultaneously request access to the high-rate channel, it must be ensured that ultimately only one subscriber will indeed get access to the high-rate channel. This can be effected in different ways. One possibility is to give the bit samples which are fixedly assigned individually to the separate subscribers different priorities, and when bit samples for a plurality of subscribers are simultaneously transmitted in the same signalling word to pass on only the bit sample having the highest priority. If the requests for access are continued the subscribers will consecutively be given access to the high rate channel in the sequence of their priorities.

An alternative way to allow access to the high-rate channel to only one out of several subscribers at a time is to combine according to an OR-function the binary values of the bit samples of different subscribers which are simultaneously transmitted in the same signalling word. A subscriber who after transmission of his bit sample receives a different bit sample will, after a statistically determined time interval, again transmit his bit sample in a signalling word. Thus, the subscribers wanting to transmit a data packet will be given access to the high-rate channel in a statistic sequence.

Even though the individual subscribers have different levels of hierarchy, certain subscribers may have data packets to be transmitted more often or in a faster sequence. To ensure that such subscribers do not have to wait too long, since even if a buffer store is present it might overflow, different priorities can be allocated to the subscribers, for example, on installing of the transmission path. To take into account these priorities in the last-mentioned implementation of the method for the selection of the order of succession of access of a plurality of subscribers to the high rate channel, it is efficient to provide that the time intervals for repeated transmission by subscribers of a lower priority are longer than such time intervals for subscribers having a higher priority. The different time intervals, instead of can easily be produced when the time intervals being controlled in a statistical way, are set by bit samples which recur at longer periods.

A most frequently suitable solution of conflicting cases, i.e., cases in which several subscribers seek access to a high-rate channel simultaneously, can be obtained when the binary values of the bit samples of several subscribers, which values are transmitted simultaneously in the same signaling word, are processed in accordance with an OR-function; the bit samples assigned to the subscribers being chosen from two groups of which the bit samples of the first group comprise in a first portion only bit values of the second group's binary value and the bit samples of the second group comprise in a second portion only bit values of the first group's binary value.

This solution of conflicting cases is accomplished by means of a corresponding choice of the bit samples. Because of the processor instruction how to select the bit samples, a number of bit values which are possible with a predetermined bit sample length are indeed not utilized, so that for a given number of subscribers longer bit samples are required than when all the possible bit combinations are utilized. However, the additional time required as a result thereof is essentially less than the loss of time caused by unsolved conflicting cases.

This solution of the problem of conflicting cases is particularly effective when the two bit sample portions do not have a bit in common. This implies that the two bit sample portions within the bit sample do not overlap. In addition, conflicting cases are resolved in an optimum manner and particularly short bit samples are obtained when the two bit sample portions together accurately constitute the complete bit sample.

In the bit sample selection according to the invention, in the case in which there are two subscribers who simultaneously transmit their bit samples and one subscriber transmits a bit sample of the first group and the other subscriber transmits a bit sample of the second group, that subscriber is ultimately granted access to whom a bit sample of the second group is assigned. To make advantageous use of this fact, it is efficient for the two bit sample portions to comprise the same number of bits. This implies that the bit sample comprises an even number of bits.

If, as mentioned in the foregoing, the subscribers whose bit samples are assigned to the second group have priority in a conflicting case over the subscribers to whom a bit sample of the first group is assigned, this results indirectly in a priority allocation. If this is to be be avoided, then in the subscriber stations the bit samples assigned to the individual subscribers may be cyclically interchanged in the ring transmission path in response to a common control signal from the central unit. In this way the preference given to one group of subscribers is compensated.

A way to achieve this compensation is to form groups of paired stations and provide that in response to a control signal each station takes over the bit sample of paired station; a bit sample of each pair of stations being associated with the first group and the other bit sample of the pair of stations being associated with the second group.

To provide in this case that the individual stations have relative to each other the same status to the maximum possible extent, it is efficient for the two associated bit samples to be chosen such that each of the two stations is given access to the data bus in 50% of all the conflicting cases in which one of them is given access to the data bus. In this way, in such a pair of stations each station is preferred or not preferred just as often.

When there are only few stations or the bit samples are of an adequate length, a method of this type may further provide that to each station both a bit sample of the first group and a bit sample of the second group are assigned and that in response to a control signal a change-over to the other bit sample is effected.

To ensure that all the stations have indeed equal rights, it is efficient for the respective two associated bit samples to be selected such that on a time average each station has access to the data bus in 50% of all the collision cases in which one station keeps access to the data bus. For each station to which two bit samples are assigned the number of times it is preferred or not preferred are consequently the same, so that these two states cancel each other on an average.

Protecting the groups containing narrow-band channels against access by subscribers wanting to transmit data packets can be effected by a separate identification of the first bit sample transmitted in the signalling words assigned to said groups. A simpler solution however is to provide that the first bit sample assigned to the narrow-band channels is given the highest priority in all positions over the highest binary value present in that position in all the remaining signaling words. As a result thereof, the bit sample in the signal word for the groups comprising narrow-band channels is processed in the same way as the bit samples of all the other signaling words. This results, because of the assignment of the highest priority to the corresponding binary values, in the groups with narrow-band channels being protected against access by all subscribers wanting to use them as a high-rate channel.

In many cases the group of words in the high-rate channel is shorter than the data packet a subscriber wants to transmit. So as to ensure that this data packet is not broken up in portions which are transmitted with very large intervals while, for example, in the meantime another subscriber having a higher priority accesses the high-rate channel, it is efficient for a subscriber wanting to transmit a data packet longer than one group of words to transmit on reception of his bit samples in at least the immediately subsequent signaling word a bit sample of the highest priority or within each position the highest binary value present in all the further signaling words in that position. In this way the subsequent group(s) is/are assigned without fail to the subscriber having a longer data packet, as there is no further subscriber having this highest priority. Thus, a longer data packet can be transmitted reliably in immediately consecutive groups of words in the high-rate channel.

Embodiments of the invention will now be described by way of example with reference to the accompanying drawings.

DESCRIPTION OF THE PREFERRED EMBODIMENTS

Figures 1, 5:
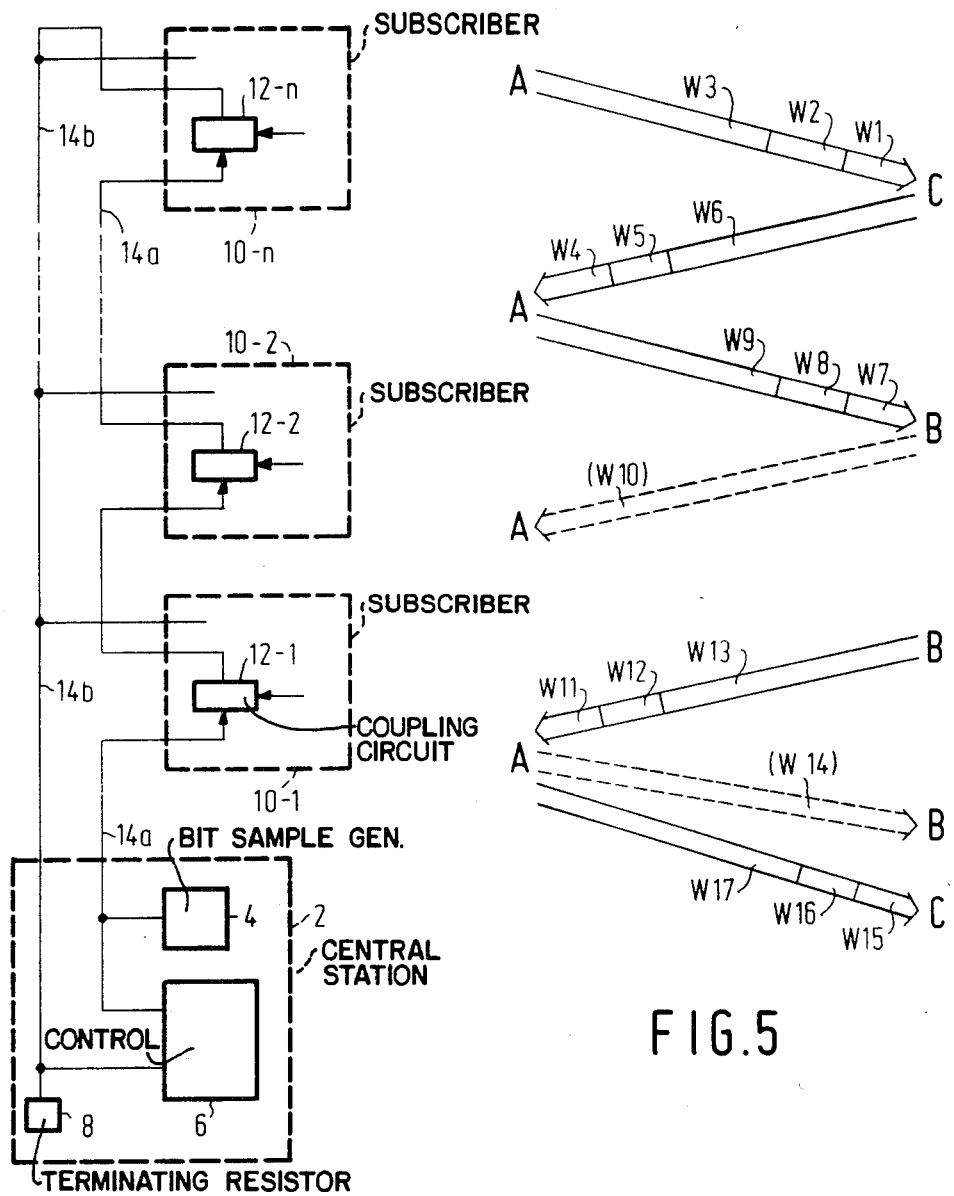
FIG. 1 shows a time-division multiplex message transmission path in a loop structure with a plurality of subscribers.
FIG. 5 shows an example of the use of the high rate channel for establishing the connection in a narrow-band channel.

FIG. 1 is based on a loop message path, in which the transmission line 14a from the central station 2 leads through all the subscribers 10-1, 10-2 to 10-n and thereafter returns to the central unit 2 as a reply line 14b, branches leading to each receive arrangement of the subscribers 10-1 to 10-n. In each subscriber station 10-1 to 10-n coupling circuits 12-1, 12-2 to 12-n are provided by which the relevant subscriber can feed messages into the transmission line 14a. Further arrangements of the message path are alternatively possible, for example a non-directional bus or a tree-structure or a ring-structure.

In the central station 2 there is connected to the transmission line 14a a bit sample generator 4 which generates on this transmission line an uninterrupted time sequence of frames of a number of words each having a plurality of bits. In prior art message paths for the transmission of speech it is general practice to use 8-bit words, and the following description is based on such a structure. Connected to the receiving line 14b is a terminating resistor 8 which terminates the receiving line in a reflection-free manner. In addition, a control arrangement 6 which more specifically provides the management and allocation of narrow-band channels is connected to the transmission line 14a and to the receiving line 14b.

Figure 2:
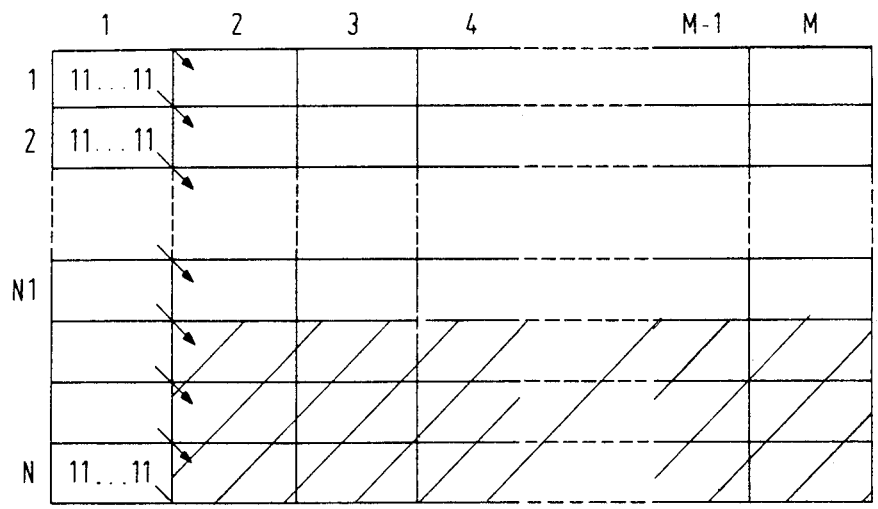
FIG. 2 shows the basic construction of a frame of groups of words.

An example of the structure of a time-division multiplex frame produced by generator 4 is shown in FIG. 2. This frame comprises N groups each having M words, each word with the number of bits therein being represented only as a box for the sake of simplicity, and the time-sequential groups of words being arranged vertically for the sake of clarity. The frame structure shown in repeated cyclically, that is to say after the word M of the group N of a frame the word 1 of the group 1 of the subsequent frame follows. The synchronizing information to identify the structure of the frame in the individual subscriber stations is not shown in greater detail here, and it is assumed that this synchronizing information is transmitted over additional channels.

As a sampling rate of 8 kHz is usually used to digitize speech signals prior to transmission, the repetition rate of the time-division multiplex frames has been chosen to be equal to this sampling rate in the example described. For the transmission of speech signals between any two subscribers it is therefore sufficient to fixedly assign a predetermined word to each active subscriber. Each word in the frame consequently represents a transmission channel having a sampling of 8 kHz. Assigning or of the respective channels to respective subscribers is effected by the control unit 6 in the central station 2 using a procedure which will be described hereinafter.

Such a channel pattern is however not optimal for the transmission of data packets. For small data packets the call setting-up phase may occupy such a channel for a period of time which is in no reasonable proportion to the duration of the data packet and consequently represents an unacceptable delay and also utilizes the transmission channels to a poor extent because of the proportionally excessive long call setting-up phase. In addition, for large data loads such a channel is too slow, so that excessive time delays occur in transmission.

Hence, one of two sections of the frame are assigned to the individual word groups in accordance with the lines in FIG. 2, narrow-band channels being assigned to the upper section comprising the groups 1 to N1, whilst the hatched word groups are assigned to the high-rate channel.

Word 1 in each of the groups 1 to N represents a signaling word which in this example is assigned to the subsequent group, as indicated by the arrows. So word 1 of group N is the signalling word which is assigned to the words 2 to M of the group 1, which represent narrow-band channels. Similarly, word 1 of group 1 is the signaling word assigned to the words 2 to M of group 2 etc. . . . The bit sample contained in the signal words assigned to the groups of words representing narrow-band channels will be described hereinafter.

When a subscriber wants to transmit a data packet, he first transmits a bit sample corresponding to his address, in a signaling word which is assigned to a group of words in the high-rate channel, it being assumed that the relevant signaling word is free and does not comprise a bit sample corresponding to an address of a subscriber having a higher priority. This bit sample in the signaling word is transmitted in the arrangement shown in FIG. 1 by the transmission line 14a and returns again by the receive line 14b after a propagation time delay determined by the length of the transmission line and the delay of the coupling circuit 12 in the individual subscriber stations to the transmitting subscriber station. If that subscriber station receives the transmitted bit sample without any distortion this indicates that no other subscriber or no subscriber having a higher priority has tried to transmits his bit sample in the relevant signaling word, and consequently the subscriber station transmits the data packet in the group of words assigned to that signaling word; namely, starting with word two of such group. The data packet may, for example, begin the word 2 with the number of the subscriber to which the data packet is to be transmitted. Further control information can also be included.

Figure 3:
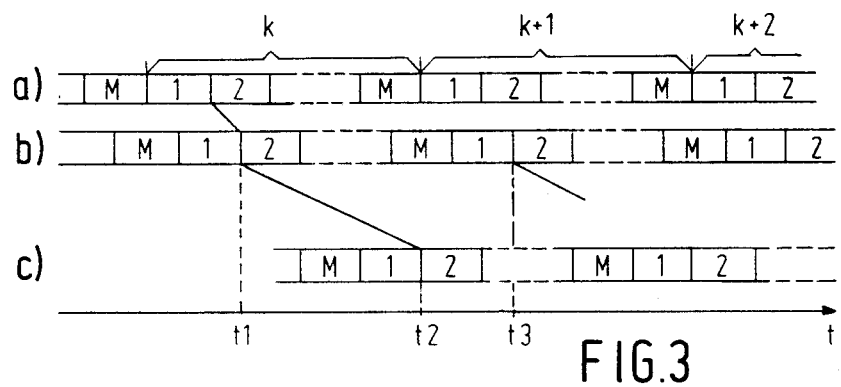
FIGS. 3 and 4 show the time ratios of the access to a high-rate channel for different time delays on the message transmission path.

The spacing between the signaling word in a given group and the group to which the signaling word is assigned depends on the maximum signal propagation delay time of the message path. This maximum signal propagation time delay occurs in the arrangement of FIG. 1 for the subscriber station 10-1, as a word transmitted by this subscriber station must travel through the whole transmission line and through all the other subscriber stations and thereafter through the whole receive line. FIG. 3 shows the time ratios for the case in which this maximum signal propagation time delay is shorter than the duration of a group of words. In line a the frame structure is indicated at the instant at which it is transmitted by the generator 4 in the central unit 2. Two complete groups k and k+1 and also the start of the subsequent group k+2 are indicated, and in these groups only the first two words 1 and 2 and also the last word M are shown. This frame structure arrives at the subscriber station 10-1 sometimes afterwards, as is indicated in line b. At instant t1 the subscriber 10-1 has transmitted in the signalling word 1 of the group k the complete assigned bit sample to the transission line. This bit sample passes through the whole transmission line and all the subscriber stations and returns via the receive line to the subscriber station 10-1, where it arrives complete and undisturbed at instant t2, as is shown in line c. As the beginning of the second word of the subsequent group k+1 is located at the instant t3 after instant t2, the transmission of the data packet can be started. So in this case each signaling word is assigned to the subsequent group.

Figure 4:
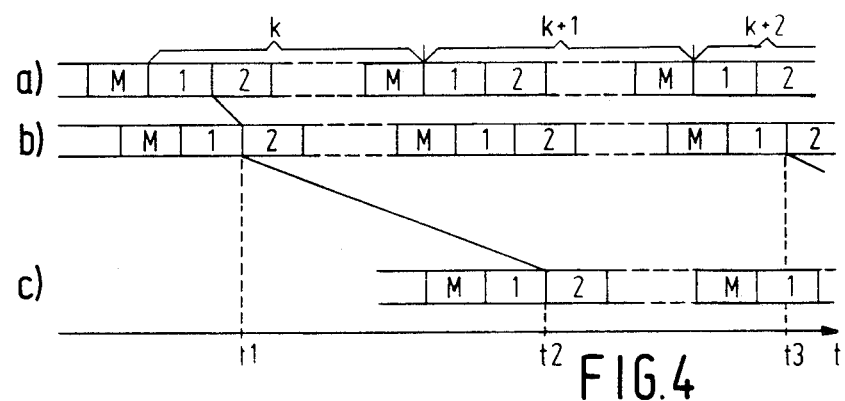

If in contrast therewith the signal propagation time delay in the message path between the transmission of one bit sample and its reception at subscriber station 10-1 exceeds the duration of a group of words, the time ratios indicated in FIG. 4 occur. The lines a and b correspond to FIG. 3. Also in this FIG. 4 the subscriber 10-1 has transmitted at instant t1 his complete bit sample in the signaling word 1 of the group k. The instant t2 of the complete reception of this bit sample in the subscriber station 10-1, at which instant this subscriber station can be sure that the bit sample has been received without disturbance, is located after the beginning of word 2 of the group k+1. Consequently the subscriber station 10-1 cannot start the transmission of a data packet with word 2 of group k+1, but only with word 2 of the group k+2 at the intant t3. In this case each signaling word is therefore assigned to the next plus one group. This is not changed by the fact that for subscriber stations located near the ends of the loop the transmission time is shorter than the duration of a group of words, as the allocation of signaling words to a group must be the same for all subscriber stations.

The data packets may comprise a great diversity of data. For the reason it may be desirable to establish a narrow-band connection between two subscribers by means of data packets transmitted through the high-rate channel. This is symbolically shown in FIG. 5. Let it be assumed that subscriber A desires a connection to subscriber B. For that purpose subscriber A transmits in a group of words over the high-rate channel in the first word W1 the address of the central unit as a target address and in the subsequent word W2 his own address as a source address. In the subsequent word W3 and possibly further subsequent words, the type of connection desired can be specified in greater detail. The central unit keeps account of the occupation of the narrow-band channels and in response to the request from subscriber A selects a free pair of channels which the central unit sends in a subsequent data packet in any subsequent group of words in the high-rate channel to the subscriber A. The address of the subscriber A is comprised as a target address in the first word W4 of this data packet and the address of the central unit is contained as a source address in the next word W5, whilst the two channels are indicated in the subsequent word or words W6 in the form of the number of the relevant group of narrow-band channels and the number of words contained therein.

Thereafter subscriber A transmits a data packet in a following group of words in the high-rate channels to subscriber B, the first word W7 of the data packet giving the address of the subscriber B and the next word W8 giving the address of the subscriber A, and subsequent word or words W9 giving the details about the channel numbers being transmitted, as subscriber A has received them from the central unit. If desired, the subscriber B can then transmit to subscriber A over the high-rate channel an acknowledgement in the form of a data packet W10 which is of a similar construction as described in the foregoing. The conversation between the two subscribers A and B can then be held in the two allocated narrow-band channels.

When the conversation has ended, for example by subscriber B, he transmits a data packet to subscriber A which in the first words W11 and W12 again comprises the addresses of the two subscribers and in the subsequent word or words W13 a code for the release message. Also, if so desired, the subscriber A may send an acknowledgement message W14 via the high rate channel to the subscriber B to inform him that the release message has arrived. As soon as subscriber A ends the conversation, that is to say he puts, for example, the receiver on its hook, he transmits over the high-rate channel a data packet to the central exchange, which packet comprises in the first words W15 and W16 again the address of the central unit and the address of subscriber A and in the subsequent words W17 a code word for the release and optionally the numbers of the two released channels. The central unit registers them as being free again.

If more connection requests arrive simultaneously in the central unit than free narrow-band channels are available, then the central unit can immediately increase the number of narrow-band channels by transmitting in the signaling word for the first group of words in the high-rate channel also the bit samples assigned to the narrow-band channels. In consequence the corresponding groups of words are immediately and directly protected against access by subscribers as a high-rate channel.

direct access to a group of words in the high-rate channel by a subscriber is evident when this subscriber is the only one transmitting a bit sample in a given signaling word. It may, however, also occur that several subscribers attempt to simultaneously access the same group of words in the high-rate channel and transmit their assigned bit samples in the assigned signaling word. In that case it must be ensured that only one subscriber gets access to the group assigned to this signaling word and that this subscriber is immediately informed of this fact, whilst the other competing subscribers are also immediately informed that they have not obtained access. Several methods can be used for this purpose.

A feasible method is to check whether the bit sample on the transmission line which passes through all subsequent subscriber stations in the loop wanting to transmit a data packet has a higher priority than their own bit samples. If so, the bit sample arriving on the transmission line is conveyed further without change, and if not the higher priority bit sample is conveyed further instead. As a result only that subscriber of the subscribers ready for transmission is given the right to transmit who transmits the bit sample having the highest priority.

A further possibility is to combine on the transmission line the bit samples of all such subscribers in accordance with an OR-function. This results in that, except for the rare case in which the combination forms the address of a subscriber wanting to transmit a data packet, none of the subscribers ready for transmission is given the right to transmit. They must therefore try again to find a free signaling word by again transmitting their own assigned bit samples at statistically varying instants.

The possibility that a subscriber who is ready to transmit tries to find a free signaling word from the very beginning is not possible without additional measures being taken, since the priority of the subscribers immediately follows from their order of succession in the transmission path. That is to say, the subscriber nearest the central unit has automatically the highest priority as he always finds free signaling words, except in the narrow-band channels. However, this distribution of priority is often undesired.

These two above-described possibilities have in common that the most significant bit sample or the bit sample which has the logic value "1" in all positions always prevails. Consequently this bit sample can be transmitted by the central unit in the signaling words assigned to the groups with the narrow-band channels. As none of the subscribers has such a high priority, i.e. the logic value "1" in all positions, the narrow-band channels are automatically protected from direct access by a subscriber.

Both methods can be modified so that the bits of the bit sample which are evaluated as priority bits can possibly be changed by the associated subscriber. In the simplest case the bit sample comprises a portion indicating the address of the relevant subscriber and a portion indicating the priority. The effect of this modification is therefore immediately obvious for the first method in which only bit samples having the highest priority are transmitted.

In the second method the above modification results in an improved utilization of the channels when only one subscriber is assigned to each position in the portion of the bit samples used for indicating priority. Thus, when a plurality of subscribers simultaneously transmit a bit sample in the same signaling word they need only to check after reception of that bit sample in which highest position a priority bit is available. Only the subscriber associated with this position then gets access without fail, whereas the other subscribers must repeat their efforts. Consequently, in contrast with the situation in which in the case of a collision all the subscribers seeking access must wait, and as a result of which the corresponding high-rate channel cannot be employed, the subscriber to which the highest position is assigned can immediately access the high-rate channel.

This method of allocating priority can however only be used for a small number of subscribers, when the signaling words used for priority identification do not claim too great a portion of the total number of transmission channels. In the general case, when several subscribers each having the same priority are present, they can be allocated by using the second method to define classes of time delays on the basis of which the individual subscribers again start an attempt to get access after an unsuccessful attempt. It is, for example, possible to define two different classes of time delays, namely one class for the normal case and the other class for those subscribers at whose attempt to get access an access of an other subscriber with a higher priority was simultaneously requested but who however could also not obtain access as he was not the only subscriber having higher priority. It is therefore necessary to adapt the priority depending on the situation, instead of using a fixedly assigned priority.

A still further method by which in conflicting cases a subscriber actually gets access as frequently as possible and, in addition, at low cost an equal priority can be obtained for all subscribers, is provided by a predetermined choice of the bit sample used from the possible bit combinations for a given length of the bit samples. It will now be described how the bit samples can be chosen and assigned to the subscribers to obtain the highest number of times in which of the combination of two bit samples one of the two bit samples is preserved. Thus, in the case of collisions, when two subscribers simultaneously transmit their bit sample over the data bus, one of the two bit samples is preserved as often as possible and the associated subscriber can subsequently transmit a message. First it will be described how priority control is associated with the bit sample selection and their immediate assignment to a station. In addition, a description is given how this priority control can be effected such that on an average all the subscribers will have equal rights of access.

The bit sample transmitted by a subscriber comprises n bits. Two groups are chosen from the number of bit samples which can be formed with these n bits. In the first group the bit samples contain, for example, only the value 0 in the first $n_1$ positions. This value 0 then relates to the OR-operation effected on the data bus, that is to say linking a bit having the value 0 to a bit having the value 1 results in a bit having the value 1. Because of the restrictions when forming the groups, the first group contains not more than $2^{(n-n_1)}$ bit samples. In the second group all the samples in, for example, the last $n_2$ positions contain only bits having the value 1. Consequently, also the second group does not contain more than $2^{(n-n_2)}$ bit samples. An example in general form is given here below:

| Bit sample of group 1 | 0000XXXX |
|---|---|
| Bit sample of group 2 | XXXX1111 |

Therein the symbols X indicate that these positions may contain either the bit values 0 or 1. It will be obvious that each bit value of the group 2 is preserved in the case of an OR-operation with a bit value of the group 1 when the two bit sample portions with fixed content accurately result in the complete bit sample, that is to say when $n_1+n_2=n$. To utilize this effect to the best possible extent, the two groups must be of the same size, that is to say both bit sample portions must have the same length, so that $n_1=n_2=n/2$.

The appended table shows a more detailed example for bit samples of that type with n=8 bits. From this example it will be obvious that a total of 31 bit samples can be formed. The bit samples 1 to 15 belong to group 1, the bit samples 17 to 31 belong to group 2. The bit sample 16 belongs to both groups. In group 1 the first four bits have the value 0 and the last four bits pass through all the binary numbers which can be represented by 4 bits. The same applies to the bit samples of the group 2, in which the first four bits pass through all the binary numbers and the last four bits have the value 1. When 31 stations are available, to each of which a different bit sample of the 31 bit samples shown in the table is assigned, then, in the event of collisions of any two subscribers, there is a probability of 76% that one of the two bit samples is preserved. When in the event of a collision between two subscribers one subscriber is allocated the bit sample 1, 16 or 31, one of the two combined bit samples is preserved. The cases in which, in the event of collisions none of the bit samples is preserved are approximately equally divided over the remaining bit samples.

In the event of a fixed assignment of the bit samples shown in the appended table to the subscribers, no equal priority allocation is obtained as a bit sample of group 2 is always preserved relative to a bit sample of group 1, and within group 1 the bit sample 16 is always preserved and within the group 2 the bit sample 31 is always preserved.

In order to prevent a non-uniform priority allocation, the assignment of the bit samples to the subscribers must be interchanged. This can, for example, be effected by providing that in response to a given control signal which may, for example, be comprised in the frame synchronizing word S, all the subscribers take over the bit sample of each preceding subscriber, the first subscriber taking over the bit sample of the last subscriber. This need of course not be effected by means of an external data transmission, for example the data bus 8, but all the bit samples are stored in each station and the station then switches to the next, stored bit sample.

Another possibility which is easier to realize in certain circumstances, is that as regards their bit samples two subscribers form a pair, a bit sample of group 1 being assigned to one subscriber and a bit sample of group 2 being assigned to the other subscriber. Also in that case no transmission is required for the interchange of the bit samples, but each station can form the new bit sample in the following way:

Step 1: the bit sample portion having the four zeros of a bit sample of group 1 is placed behind the other four bits;

Step 2: the bit sample thus created is inverted.

This pairing operation has the property that for one subscriber of a pair the bit sample is preserved $k_1$ times in any collision case and that it is not preserved $k_2$ times, and for the second subscriber the reverse distribution is obtained, that is to say its bit sample is preserved $k_2$ times and not preserved $k_1$ times. This means that for a pair of subscribers a bit sample is preserved or not preserved an equal number of times. If the percentage of collision cases in which no bit sample is preserved is only small, then this type of distribution of the bit samples over the pairs results in all subscribers having mutually equal rights, whereas for all subscribers it is preserved or not preserved the same number of times because of the pair-wise exchange of the bit samples.

An exceptional case is the case in which less than 16 subscribers are available for the bit samples shown in the appended table. Then namely each subscriber can as it were form a pair with itself, if each subscriber is assigned a bit sample pair of the above-mentioned type, and each subscriber switches repeatedly between the two bit samples. It will be obvious that also in this case all the subscribers have on an average virtually equal rights. An additional advantage in this case would be that the switching procedure can be effected without synchronization with other subscribers, for example after each successful transmission. However there may be more important reasons to give each subscriber at all times a comparatively high priority, because they exclusively utilize, for example by means of a corresponding information via the data bus or a control of their own the bit sample of group 2 and do not switch over.

It may frequently happen that a subscriber wants to transmit a data packet which is longer than a group of words. When such a subscriber gets access to a group of words in the high-rate channel and transmits a portion of the data packet in conformity with the length of the group, it is possible at his next attempt to get access to the high-rate channel for the remaining portion of the data packet that other subscribers having higher priorities also try simultaneously to get access, and consequently with greater success. Particularly in the method according to which a subscriber starts a new attempt for a random period of time, the transmission of a longer data packet can be distributed over a longer period of time. This may cause difficulties on reception. To avoid this difficulty, a subscriber having a longer data packet can as soon as he has recognized an authorized access to a group of words in the high-rate channel, try to get again access for the remaining portion or a further portion of the data packet in the subsequent signaling word, his priority however being changed into the highest priority. As a result thereof this subscriber having the long data packet inevitably gets access to the next group or several next groups of words in the high-rate channel, so that the data packet can be transmitted contiguously. It is then a condition that no other subscriber has normally this highest priority. In order to avoid difficulties at the partition between the high-rate channel and the narrow-band channels this highest priority must definitely be below the priority used by the central unit for the narrow-band channels.

An embodiment of the method will now be described, only the most important elements being shown insofar as they are important for the technical realisation.

Figure 6:
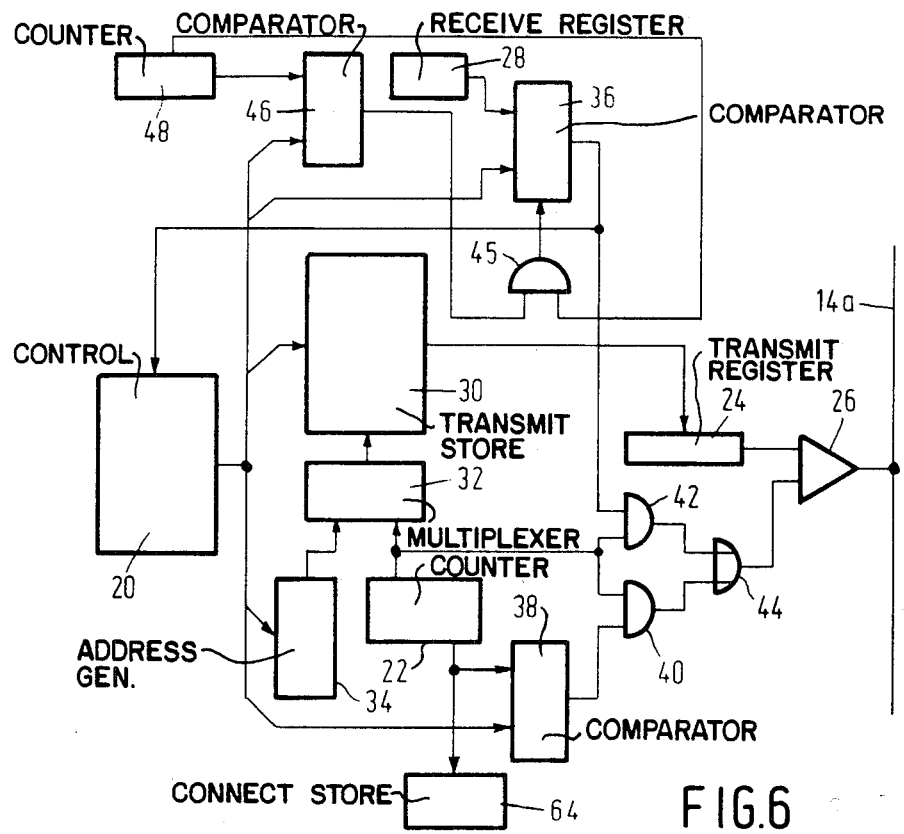
FIG. 6 shows a block diagram for the control at the transmission end of the signalling for access to a high-rate channel.

In FIG. 6 a request for transmission a data packet from a subscriber station connected thereto (not shown) is received and processed by a control 20 which can, for example, by a fixed-program micro-processor. This control 20 provides a portion of the sequence of operation of the individual procedures and supplies some of the necessary data words.

For access to a group of words in the high-rate channel for the transmission of a data packet, this data packet is written by the control 20 into a signaling-transmit store 30 which is capable of storing a number of data words corresponding to a group in the time-division multiplex frame. Addressing this store 30 is effected via a multiplexer 32 from an address generator 34 which is also controlled by the control 20. The data of the data packet are stored in the store 30 in such a way that they are contained therein in the sequence of transmission. At the location of the first address the bit samples generated by the control 20 is stored.

A counter 22 is provided which counts in synchronism with the words of the time-division multiplex frame on the transmit line 14a, the arrangements used for this synchronization not being shown here for the sake of clarity, as they are sufficiently known. When a binary counter is used for the word counter 22, the outputs for at least significant bits provide the word number within the group and the outputs for the most significant bits provide the number of the group.

The counter outputs are connected to one input of a comparator 38 whose other input is controlled by the control 20 by the number of the group in which the signaling word reporting a request for connection must be transmitted.

This number of a group may be the number of the first group of the high-rate channel, assuming that at an earlier instant the central unit has informed all the subscriber sets via the high-rate channel about any changes in the partition between the high-rate channel and the narrow-band channels to ensure that a subsequent request for access is successful. Otherwise it may be the number of any group.

As soon as this group of words in the time-division multiplex frame on the transmit line 14a starts, the comparator 38 releases a signal which renders an AND-gate 40 conductive. Simultaneously the counter 22 produces the number of the first word of this group, i.e. the signaling word, in response to which an output signal of the AND-gate 40 energizes the transmit amplifier 26 via the OR-gate 44, and in addition the address from generator 34 is applied via the multiplexer to the store 30 which then reads the 8 bits of the corresponding first storage locations and applies them in parallel to a transmit register 24, from where they are sequentially conveyed to the transmit amplifier 26. This amplifier then transmits via the transmission line 14a the corresponding bit sample contained in this 8-bit word, irrespective of the fact whether there are already data at that moment on the transmission line.

A further comparator 36 compares the bit samples received in the receive register 28, which will be further described with reference to FIG. 7, to the bit sample supplied by control circuit 20 and which is the same sample which was written in the first address location in store 30 and transmitted in the manner described above. However, this comparison is effected, under the control of the AND-gate 45, only in one specific place or at a predetermined instant, respectively, in the frame, namely in the first word of that group in which the bit sample was transmitted at the transmission end. To that end an additional comparator 46 is provided which compares corresponding output values of a counter 48 which will also be described in greater detail with reference to FIG. 7, to the number of the group supplied by the control circuit 20, which group was also applied to the comparator 38. When this group occurs in the frame at the transmission end, the comparator 46 applies a signal to one input of the AND-gate 45, whose other input is connected to an output of the counter 48 in FIG. 7, which only produces a signal at the occurrence of the first word of the group, i.e. at the occurrence of the signaling word. In this manner the comparator 36 checks whether the bit sample transmitted in the signaling word of a specific group is received unchanged at the subscriber station in the same place in the frame.

Should this not be the case, then a corresponding signal is applied to control circuit 20, signifying that the subscriber station has not obtained access to the desired group in the high-rate channel and that it must try again at a later instant, it being possible, in accordance with the above description, that the bit sample has changed. If however the bit sample received agrees to the bit sample transmitted at this station, then in the next group of words in the time-division multiplex frame at the transmission end the AND-gate 42 is enabled by the counter 22 from word 2 onwards and consequently the transmitter amplifier 26 is enabled via the AND-gate 44. Simultaneously, counter 22 sequentially reads via the multiplexer 32 the further words from the store 30, the words being stored in parallel in the transmission register 24 and sequentially applied from there to the data input of the transmission amplifier 26. In this manner the data packet contained in the store 30 is transmitted via the transmission line 14a. The output values of the counter 22 are further applied to the connection store 64 which will be described in greater detail with reference to FIG. 8.

Figure 7:
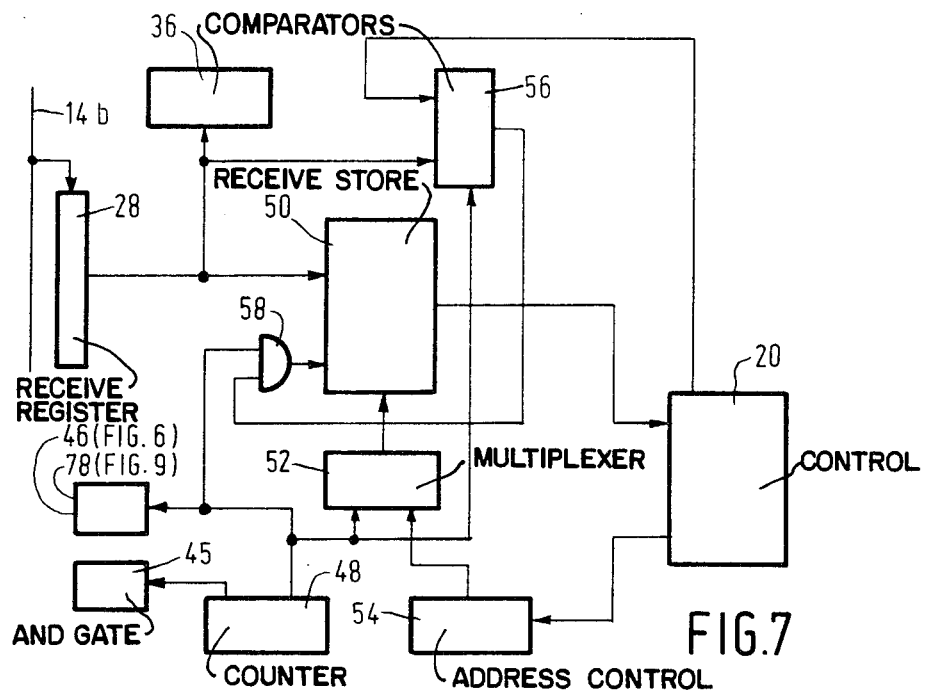
FIG. 7 is a block diagram for the control of the reception of a data packet transmitted over a high-rate channel.

An arrangement for receiving a data packet is shown schematically in FIG. 7. The data which enter via the receive line 14b are applied to a receiving register 28 which sequentially stores each bit associated with a word and supplies it in parallel from the output. Also here a counter 48 is present which runs in synchronism with the words in the time-division multiplex frame of the receive line 14b and supplies from the outputs the least significant bits of the word number within each group and the group number for the most significant bits. For the sake of simplicity, the outputs of counter 48 are all represented as a single line, the output for the first word of each group controlling, as described in the foregoing the comparator 46 in FIG. 6. In addition, the output values of counter 48 are also applied to a further connection store 78, which will be described in greater detail with reference to FIG. 9. Also here the synchronization of the counter 48 is not shown for the sake of simplicity.

The output of the receiving register 28, which as described above, also leads to the comparator 36 in FIG. 6 is furthermore connected to the input of a further comparator 56, which receives at its other input from the control 20 the number of the relevant subscriber station in which this arrangement is contained. This comparator 56 is made conductive by each output value of the counter 48 for the second word of a group, as this word always represents the first word of a data packet and contains the target address, that is to say the address or number of the subscriber station for which the data packet is intended. So when a data packet intended for the subscriber station whose receiving section is shown in FIG. 7 arrives, the comparator 56 supplies a signal which renders the AND-gate 58 conductive for the rest of the words of this group. This gate further receives during the subsequent words of the group signals from counter 48 and during this period of time switches a store 50 to the writing mode, this store being of the same construction as the store 30 shown in FIG. 6. This store 50 is addressed by the counter 48 via the multiplexer 52 and consequently writes word-sequentially the data of the following words of the relevant group which data come in sequentially via the input line 14b. After the writing procedure the multiplexer 52 is switched over and the store 50 is read under the control of the control 20 via the address control 54 and the output data are applied to the control 20 for evaluation. If the received data packet contains the numbers of narrow-band channels in which subsequently a narrow-band channel speech connection must be established, then the control 20 controls by means of the data read from the store 50 a connection store as will be described in detail hereafter.

Figure 8:
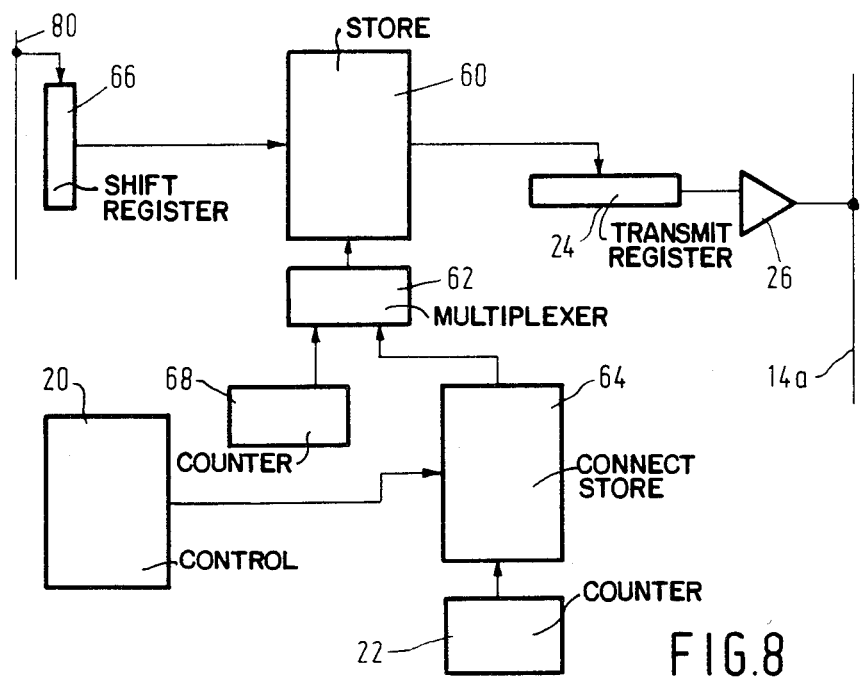
FIG. 8 is a block diagram of the control for the transmission of data in narrow-band channels.

FIG. 8 shows the most important elements of a subscriber station required for transmitting speech data over narrow-band channels, it being assumed that a plurality of subscribers are connected to this subscriber station via a receive-time division multiplex line 80, which also operates with a frame frequency of 8 kHz, in which however each frame comprise only 32 words each having 8 bits, so that 32 subscribers can be active simultaneously. The receive-time division multiplex line 80 is connected to the series inputs of a shift register 66, which in each case releases in parallel the 8 consecutive bits of a word and applies them to a data store 60, which comprises 32 storage locations for 8 bits each.

These storage locations are controlled during the writing operation via a multiplexer 62 from a counter 68 which counts in synchronism with the words on the line 80. Consequently, a predetermined word on the line 80 is fixedly assigned to each storage location in the data store 60.

The multiplexer 62 is changed-over during the reading operation and the data store 60 is addressed by the connection store 64. The latter is addressed, as described above, by the counter 22 of FIG. 6 and has a storage location for each word on the transmission-time division multiplex line 14a, so 256 storage locations are necessary for a frame structure of eight word groups each having 32 words. Each storage location is capable of storing 5 bits so as to address one storage location of the data store 60. During the call setting-up phase of the control 20 the connection store 64 is loaded with the previously received connection data contained in a corresponding data packet and gets for each word in the frame of the high-frequency time-division multiplex transmission line 14a the information from which storage location and consequently which word of the receive-time division multiplex line 80, or if any information at all in this word must be transmitted. When a word which is in agreement with a sampling value of a speech channel must be transmitted, it is read from the data store 60 and applied, for example, to the transmit buffer register 24, which bit-sequentially conveys this word to the transmittime division multiplex line 14a via the transmission amplifier 26.

As in contrast with the transmission of data packets the speech data words must be transmitted periodically with a frequency of 8 kHz, the data store 60 must periodically and alternately be written and read. This may also be effected in a time-interleaved manner, when the data store 60 can be both written-in and read-out at a different location within the duration of a word on the high-frequency transmission-time division multiplex line 14a. A short time shift of the word to be written-in may possibly be necessary, which can be easily made possible when the register 66 is of a dual construction and is alternately changed-over.

Figure 9:
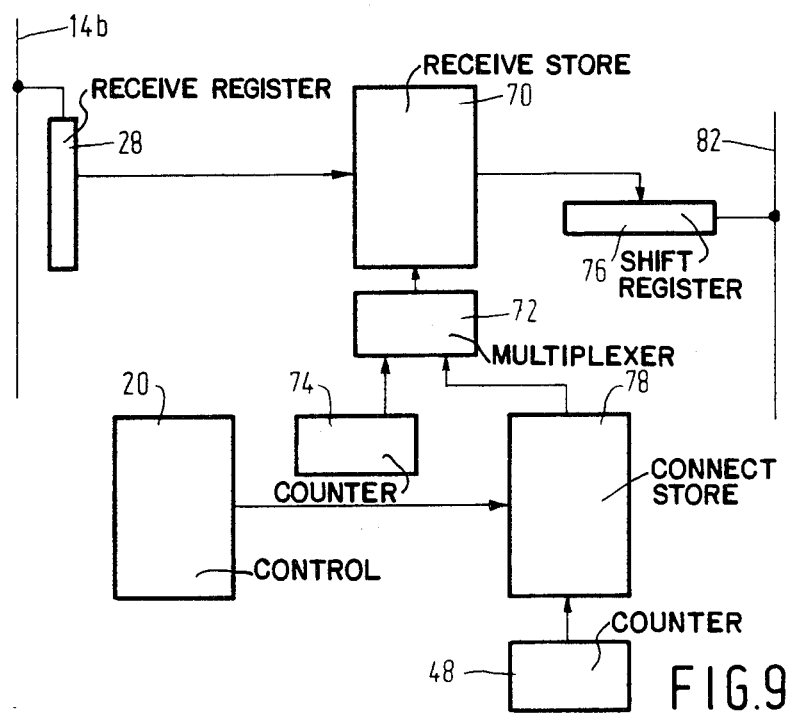
FIG. 9 is a block diagram of the control for the reception of data in narrow-band channels.

The arrangement of the components for the reception of speech data, which arrangement is shown in FIG. 9, is of a similar construction. The sequentially incoming data on the receive line 14b are again applied to the receive register 28 and converted into words which are present in parallel. These words are applied to the data input of a receive-data store 70, which is addressed by a further connection store 78 via a multiplexer 72. The function of this further connection store corresponds to a very large extent to the function of the store 64 in FIG. 8, and during the call setting-up phase it is also loaded by the control 20. As mentioned in the foregoing, this further connection store 78 is addressed by the counter 48 shown in FIG. 7, which counts in synchronism with the words in the frame on the receive-multiplex line 14b. The receive-data store 70 comprises a total of 32 storage locations each capable of storing a 8 bit word, so that the data of a maximum of 32 narrow-band channels of the receive-time division multiplex line 14b can be stored. To read the store, the multiplexer 72 switches the address input of the receive-data store 70 to the outputs of word counter 74, which counts in synchronism with the words on a low-frequency transmit-multiplex line 82 which is connected in parallel with the receive-multiplex line 80 to individual subscribers. The words read from the receive-data store 70 are sequentially applied to a shift register 76, whose series output is connected to the low-frequency transmit-multiplex line 82. Also for the receive-data store 70 writing and reading is effected in a time-interleaved manner similar to the data store 60 for the transmission side.

TABLE

|       |    |   |   |   |   |   |   |   |   |
|-------|----|---|---|---|---|---|---|---|---|
|       | 1  | 0 | 0 | 0 | 0 | 0 | 0 | 0 | 0 |
|       | 2  | 0 | 0 | 0 | 0 | 0 | 0 | 0 | 1 |
|       | 3  | 0 | 0 | 0 | 0 | 0 | 0 | 1 | 0 |
| Gr. 1 | .  |   |   |   |   |   |   |   |   |
|       | 15 | 0 | 0 | 0 | 0 | 1 | 1 | 1 | 0 |
|       | 16 | 0 | 0 | 0 | 0 | 1 | 1 | 1 | 1 |
|       | 17 | 0 | 0 | 0 | 1 | 1 | 1 | 1 | 1 |
|       | 18 | 0 | 0 | 1 | 0 | 1 | 1 | 1 | 1 |
| Gr. 2 | .  |   |   |   |   |   |   |   |   |

TABLE-continued

|    |   |   |   |   |   |   |   |   |
|----|---|---|---|---|---|---|---|---|
| 30 | 1 | 1 | 1 | 0 | 1 | 1 | 1 | 1 |
| 31 | 1 | 1 | 1 | 1 | 1 | 1 | 1 | 1 |

What is claimed is:

1. A method for controlling subscriber station access to a time-division multiplex message transmission path in which a common central control and a plurality of subscriber stations are connected in a recirculatory circuit and in which the central control produces cyclically recurring frames of a predetermined number of channels defined by a corresponding number of binary words each having a predetermined number of bits; at least one such word being assigned as a signaling word in each frame, a variable contiguous portion of the said number of words being allocated as narrow-band channels through each of which a word may be transmitted in each frame and a further variable contiguous portion of the said number of words being reserved to form a high-rate channel through which data packets may be transmitted in sequences of consecutive words; such method comprising the steps of: dividing each frame into several groups of words, and assigning particular words as signaling words which identify each of such groups; causing the central control to continuously transmit a predetermined first bit sample comprising a specified number of bits in the signalling words of the groups to which narrow band channels are assigned; prior to transmission by a subscriber station of a data packet in the high-rate channel, causing such subscriber station to transmit, in a signaling word which does not contain said first bit sample, a bit sample comprising a specified number of bits and which is individually assigned to such subscriber station; and upon subsequent return through said recirculatory loop to such subscriber station of said assigned bit sample, unaltered, in the the signaling word in which it was transmitted, causing such subscriber station to transmit said data packet in the group of words identified by such signaling word.

2. A method as claimed in claim 1, wherein all of said groups comprise the same number of words.

3. A method as claimed in claim 1 wherein each group comprises the signaling word assigned to a following group.

4. A method as claimed in claim 1, wherein the individual subscriber stations are fixedly assigned individual bit samples of different priorities; and upon the simultaneous transmission of the bit samples of a plurality of subscriber stations in the same signaling word only the bit sample having the highest priority is passed on in said transmission path.

5. A method as claimed in claim 1, wherein the binary values of the respective bits of the bit samples of different subscriber stations which are simultaneously transmitted in the same signaling word are processed in accordance with an OR-function; and in the event that a subscriber station which has transmitted its bit sample in a signalling word receives another bit sample in such signaling word, such subscriber station again transmits its in a signalling word after a statistically determined time interval.

6. A method as claimed in claim 5, wherein the subscriber stations are assigned priorities, the time intervals for repeated transmission of bit samples by subscriber stations having lower priorities being longer than such time intervals for subscriber stations having higher priorities.

7. A method as claimed in claim 1, wherein the binary values of the bits of the bit samples of different stations which are simultaneously transmitted in the same signaling word are processed in accordance with an OR-function; and the bit samples assigned to each subscriber station are chosen from one of two groups, the bit samples of the first group containing in a first portion thereof only bits of one binary value and the bit samples of the second group containing in a second portion thereof only bits of the other binary value.

8. A method as claimed in claim 7, wherein the two bit sample portions do not comprise a common bit.

9. A method as claimed in claim 8 wherein the two bit sample portions together accurately constitute the complete bit sample.

10. A method as claimed in claim 7, wherein said portions of the bit samples of the first and second groups comprise the same number of bits.

11. A method as claimed in claim 7, wherein in the subscriber stations in response to common control signals from the central control the bit samples assigned to the individual subscriber stations are cyclically interchanged in said recirculatory loop.

12. A method as claimed in claim 7, wherein both a bit sample of the first group and a bit sample of the second group are assigned to each subscriber station; and in response to a control signal from the central station the subscriber station switches from one to the other of such bit samples.

13. A method as claimed in claim 11 wherein the common control signal is a cyclic frame synchronizing signal.

14. A method as claimed in claim 7, wherein said subscriber stations are paired and in response to a control signal from the central station the subscriber stations in each pair interchange the bit samples to which they are assigned, the bit samples of each pair being from opposite ones of said groups of bit samples.

15. A method as claimed in claim 14, wherein the bit samples assigned to paired subscriber stations are chosen such that each of such subscriber stations obtains access to a word group in half the number of cases in which a word group is assigned to only one of two or more subscriber stations simultaneously seeking access thereto.

16. A method as claimed in claim 12, wherein the two associated bit samples assigned to a subscriber station are chosen such that on a time average the subscriber station obtains access to a word group in half the number of cases in which a word group is assigned to only one of two or more subscriber stations simultaneously seeking access thereto.

17. A method as claimed in claim 4, wherein the binary value of each bit of the first bit sample transmitted in a signalling word for a narrow-band channel has a higher binary value than that of the corresponding bits of all other bit samples transmitted in such signalling word.

18. In a time-division multiplex message transmission path to which a common central control and a plurality of subscriber stations are connected in a recirculatory loop and in which the central control produces cyclically recurring frames of a predetermined number of channels defined by a corresponding number of binary words each having a predetermined number of bits; at least one such word being assigned as a signalling word in each frame, a variable contiguous portion of said number of words being allocated as narrow-band channels through each of which a word may be transmitted in each frame and a further variable contiguous portion of the said number of words being reserved to form a high-rate channel through which data packets may be transmitted in sequences of consecutive words; each frame being divided into several groups of words and particular words being assigned as signalling words which identify each of such groups; the central control continuously transmitting a predetermined first bit sample comprising a specified number of bits in the signalling words of the groups to which narrow-band channels are assigned; each of said subscriber stations comprising a transmitter for transmitting data over said transmission path and a receiver for receiving data from said transmission path, and a word counter for counting words in synchronism with each frame; the improvement characterized in that:

the word counter of each subscriber station is adapted to produce first output signals identifying individual groups of words and second output signals identifying the words in each such group;

the transmitter of each subscriber station is adapted to obtain access to any of said word groups on said transmission path by transmitting in the signalling word of such word group a bit sample identifying such subscriber station;

each of said subscriber stations further comprises a comparator controlled by the word counter therein to compare the signalling word of a received word group with the bit sample transmitted by the transmitter of such subscriber station, and when there is a match being adapted to trigger such transmitter to transmit a message in the second and subsequent data words of the word group corresponding to the signalling word in which such bit sample was received, said comparator being further adapted to interrupt transmission by said transmitter when the bit sample in the signalling word of a received word group does not match the transmitted bit sample;

said comparator of each subscriber station being further adapted to interrupt transmission by the transmitter of such subscriber station when, in the signalling word of the word group with which a bit sample identifying such subscriber station is compared, a bit sample identifying a word group to which narrow band channels are assigned is simultaneously transmitted by the central control.

* * * * *

UNITED STATES PATENT AND TRADEMARK OFFICE
CERTIFICATE OF CORRECTION

PATENT NO. : 4,592,049

DATED : May 27, 1986

INVENTOR(S) : ULRICH KILLAT ET AL

It is certified that error appears in the above-identified patent and that said Letters Patent is hereby corrected as shown below:

```
In the Abstract
line 1, after "Method"  insert --for--
line 2, change "the" to --each--
line 6, change "the" to --a--
        change "for" to --. For--
line 7, after "channels" insert --, a signalling word which--
line 9, before "is" insert coma --,--
line 12, change "When" to --If--
```

Signed and Sealed this

Fifteenth Day of September, 1987

Attest:

DONALD J. QUIGG

Attesting Officer

Commissioner of Patents and Trademarks